United States Patent [19]

Sugisawa et al.

[11] Patent Number: 5,384,684
[45] Date of Patent: Jan. 24, 1995

[54] METALLIZED PLASTIC FILM CAPACITOR

[75] Inventors: Kunio Sugisawa, Yokohama; Hiroyuki Hoshino, Kawasaki; Shozo Hayashi, Yokohama, all of Japan

[73] Assignee: Nippon Petrochemicals Company, Limited, Tokyo, Japan

[21] Appl. No.: 98,309

[22] PCT Filed: Dec. 10, 1992

[86] PCT No.: PCT/JP92/01613

§ 371 Date: Aug. 6, 1993

§ 102(e) Date: Aug. 6, 1993

[87] PCT Pub. No.: WO93/12529

PCT Pub. Date: Jun. 24, 1993

[30] Foreign Application Priority Data

Dec. 10, 1991 [JP] Japan .................. 3-349857

[51] Int. Cl.$^6$ .................. H01G 4/08; H01G 4/22; H01B 3/48
[52] U.S. Cl. .................. 361/323; 361/315; 252/567
[58] Field of Search .................. 361/315, 327, 323; 585/6.3, 24–26; 252/567, 570; 174/17 LF, 25 C; 29/25.42

[56] References Cited

U.S. PATENT DOCUMENTS

| | | | |
|---|---|---|---|
| 4,591,948 | 5/1986 | Sato et al. | 361/315 |
| 4,639,833 | 1/1987 | Sato et al. | 361/315 |
| 4,929,784 | 5/1990 | Klinkman et al. | 585/422 |
| 4,931,900 | 6/1990 | Lobo et al. | 361/315 |
| 5,107,395 | 4/1992 | Kawakami et al. | 361/315 |

FOREIGN PATENT DOCUMENTS

| | | |
|---|---|---|
| 55-5689 | 2/1980 | Japan . |
| 60-35408 | 2/1985 | Japan . |
| 61-51704 | 3/1986 | Japan . |

*Primary Examiner*—Bruce A. Reynolds
*Assistant Examiner*—Michael D. Switzer
*Attorney, Agent, or Firm*—Scully, Scott, Murphy & Presser

[57] ABSTRACT

An MF capacitor of an oil impregnation type, whose durability in constant voltage application is so high that it is suitable for practical use. The metallized plastic film is impregnated with an electrically insulating oil composition obtained by adding 5–80% by weight of natural fatty acid triglyceride which contains a less amount of fatty acid ester having free hydroxyl radical to an aromatic hydrocarbon having a specific chemical structure and being liquid at $-30°$ C.

6 Claims, No Drawings

METALLIZED PLASTIC FILM CAPACITOR

TECHNICAL FIELD

This invention relates to a metallized plastic film capacitor which is made by rolling up a metal deposited film. The metal deposited film has a metal layer as an electrode which is vacuum-deposited on a plastic film. More particularly, this invention relates to a novel metallized film capacitor of an oil impregnation type, which is characterized in that the capacitor is impregnated with a specific electrically insulating oil composition.

BACKGROUND ART

A metallized plastic film capacitor (hereinafter referred to as "MF capacitor") made by rolling up a metal deposited plastic film which has an electrode of vacuum-deposited metal layer such as an aluminum layer on a plastic film, has a self-healing function and a high dielectric strength. The capacitor of this kind is suitable for reducing the sizes, and accordingly, it is widely used.

As plastic films used for MF capacitors, biaxially stretched polypropylene films are widely employed because they are inexpensive and excellent in temperature characteristics of dielectric loss.

In the production of foil-rolled capacitor which is made by rolling up a plastic film such as polypropylene film together with a metal foil of aluminum or the like, or a single- or double-side metallized paper as an electrode, the impregnation with an electrically insulating oil is commonly employed. For example, Japanese Laid-Open Patent Publication No. 60-35408 discloses that an insulating oil consisting of 20–50% by volume of diarylethane, alkylnaphthalene or the like and the balance of rapeseed oil, is used for the impregnation into a capacitor that is made by rolling up a polypropylene film.

In the foil-rolled capacitors of this kind, only the impregnating properties of insulating oils relative to plastic films should be taken into consideration.

In the case of the MF capacitor, however, even when small dimensional change of base film is caused to occur by an insulating oil, or a small amount of impregnating oil penetrates into a space between a metal deposition layer and a base film, cracks occur in the metal deposition layer, and, in an extreme case, the metal layer is peeled off form the base film to cause dielectric breakdown. These phenomena such as the dimensional change of base film and the penetration of impregnating oil between a metal deposition layer and a base film, occur mainly due to the penetration of the impregnating oil into the base film.

The thickness of a metal deposition layer is very small and the metal is liable to evaporate when it absorbs the energy of partial discharge. Although this effect implies the above-mentioned self-healing function, it also causes several drawbacks such as cracks and peeling in a metal deposition layer, which is not desirable because it is liable to cause partial discharge at a lower value in potential gradient.

In view of the above facts, the aromatic hydrocarbons such as diarylethane and alkylnaphthalene as disclosed in the above-mentioned Japanese Laid-Open Patent Publication No. 60-35408 are not suitable for use in the impregnation of MF capacitors, because when they are impregnated into a polypropylene film, they exhibit a high degree of swelling and cause the peeling of metal deposition layer as described in the above patent gazette. It is, therefore, impossible to improve sufficiently the above-mentioned aromatic hydrocarbons which seriously swell the polypropylene film by impregnation.

Incidentally, when insulating paper is used as a base film of metal deposition film, the trouble such as the peeling of a metal deposition layer due to the penetration of an insulating oil, is hardly caused to occur, because the paper is a complex material made of pulp fibers and is polar to some extent. In other words, the above problem such as the peeling of metal deposition layer is characteristic of metal deposited plastic films.

When an MF capacitor is impregnated with an insulating oil, it is impossible to use an excessively viscous impregnating oil because the impregnating operation into capacitor elements is hardly carried out. In general, however, an impregnating oil having a higher viscosity hardly penetrates into a base film. As a result, the dimensional change of base film and the penetration of an impregnating oil between a metal deposition layer and a base film can be suppressed. Therefore, an impregnating oil having a higher viscosity is not always unsuitable for the impregnation of MF capacitors. In view of this fact, the description in the above-mentioned Japanese Laid-Open Patent Publication No. 60-35408 that the castor oil is not suitable because of its high viscosity cannot be applied to the case of MF capacitors.

Besides the above-mentioned Japanese Laid-Open Patent Publication No. 60-35408, Japanese Laid-Open Patent Publication No. 61-45510 (U.S. Pat. No. 4,591,948) discloses an MF capacitor which is impregnated with 1-phenyl-1-(benzylphenyl)ethane and it describes further that animal and vegetable oils such as castor oil can be used in a mixture.

According to the experiments carried out by the present inventors, high corona starting voltages and also high withstand voltages were obtained when MF capacitors were impregnated with the aromatic hydrocarbons disclosed in the above-mentioned Japanese Laid-Open Patent Publication No. 61-45510. In spite of the high withstand voltage, however, the durability was not always good in that it was several ten hours under constant voltage application at a potential gradient of 130 V/$\mu$m. Although the corona starting voltage is high, the durability under the charge of constant voltage is not so high. Because the durability under constant voltage application is rather important in practice, the improvement in this regard is desired.

Furthermore, according to the experiments carried out by the present inventors, when MF capacitors were impregnated with an animal or vegetable oil such as castor oil or rapeseed oil, the results were different from those with the above-mentioned aromatic hydrocarbons. That is, both the durability under constant voltage application and the corona starting voltage were low.

In view of the above circumstances, the present invention proposes a practically useful oil impregnated MF capacitor which has excellent durability under the charge of constant voltage.

DISCLOSURE OF INVENTION

This invention relates to a metallized plastic film capacitor which is impregnated with an electrically insulating oil composition prepared by adding 5–80% by weight of a natural fatty acid triglyceride containing a less amount of fatty acid ester having free hydroxyl radical to an aromatic hydrocarbon which is in liquid state at −30° C. and is represented by the following structural formula (1):

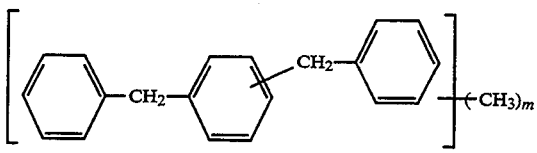

in which formula, m is an integer of 0 to 2, inclusive.

The present invention will be described in more detail in the following.

An MF capacitor according to the present invention is made by rolling up, in an ordinary manner, a metal deposited film of plastics selected from polyesters such as polyethylene terephthalate (PET) and polyolefins such as polypropylene. The metal deposited film is prepared by applying a layer of a metal such as zinc or aluminum on its one side surface or both side surfaces by an ordinary vacuum deposition method. The rolled film is then impregnated with an electrically insulating oil composition.

The base film is preferably biaxially stretched film and its surface is preferably roughened to be susceptible to impregnation. When a double-side metallized plastic film or even when a single-side metallized plastic film is used, another plastic film can be rolled up in layers together with the metallized plastic film as occasion demands. Usually, only a single-side metallized plastic film is rolled up to form capacitor elements.

The aromatic hydrocarbons of the insulating oil composition to be used for impregnation is represented by the above structural formula and dibenzylbenzene and its derivatives of dibenzyltoluene and dibenzylxylene having one or two substituted methyl groups, are included. Furthermore, they include the aromatic hydrocarbons having the methylene group between benzene rings which methylene group has a substituted methyl group or groups. The most preferable aromatic hydrocarbon of the present invention is that having a methyl group or methyl groups which are connected to the benzene rings.

In these aromatic hydrocarbons, there are several kinds of positional isomers in view of substituent groups. Their properties e.g. melting points, are considerably different. In an extreme case, some compounds are solid at ordinary temperatures. Because solid compounds cannot be used as impregnating oils, the present invention uses the compounds which are in liquid state at −30° C. taking the low temperature characteristics into consideration. So far as a compound is liquid at −30° C., the viscosity of the compound is not so high at ordinary temperatures. The aromatic hydrocarbon represented by the above formula can be used singly or in a mixture.

A preferable aromatic hydrocarbon in view of the viscosity and the like is the mixture of 10–85% by weight of dibenzylbenzene with a value of m equals 0 in the above formula, 5–90% by weight of monomethyl derivative having m of 1, and 5–80% by weight of dimethyl derivative having m of 2 (100% by weight in total). The mixture of the above composition is usually in liquid state at −30° C. and it is preferable because the viscosity is not so high at ordinary temperatures.

In the present invention, the insulating oil composition is prepared by adding 5–80% by weight, preferably 30–70% by weight of natural fatty acid triglyceride to the above-mentioned aromatic hydrocarbon (100% by weight in total with aromatic hydrocarbon). The fatty acid triglyceride contains a less amount of natural fatty acid ester having free hydroxyl radical. If the quantity of the above natural fatty acid triglyceride is less than 5% by weight, the effect of addition is not produced and if the quantity is more than 80% by weight, the effect to suppress corona discharge (partial discharge) is not produced, both of which are not desirable.

It was confirmed by the experiments of the preset inventors that the natural fatty acid triglyceride which contains much amount of fatty acid ester having free hydroxyl radical, such as the ester of hydroxy acid, e.g. ricinoleic acid or the ester of dihydroxy acid is not suitable as the impregnating oil, because it extinguishes the deposition layer of a metal such as zinc or it causes oxidation reaction owing to the free hydroxyl radical during the corona discharge (partial discharge). In the MF capacitor, the thickness of metal deposition layer is extremely small in the order of angstrom, and therefore, the metal layer as an electrode is susceptible to free hydroxyl radical. On the other hand, in a foil-rolled capacitor having a metal foil electrode of the thickness in the order of $\mu$m, the influence like this is not caused to occur.

In view of this fact, the amount of fatty acid ester having free hydroxyl radical in the natural fatty acid triglyceride is preferably less than 10% by weight, and more preferably less than 5% by weight. The natural fatty acid triglyceride which contains a less amount of fatty acid ester having free hydroxyl radical is the main component of rapeseed oil, soybean oil and poppy oil and the like, and these oils can be used in the present invention. Especially, the rapeseed oil is preferable because the effect of the present invention is efficiently produced. The properties besides the quantity of the fatty acid ester having free hydroxyl radical are not especially limited so far as the rapeseed oil and other oils can meet JAS (Japanese Agricultural Standard).

The above-mentioned aromatic hydrocarbon used in the present invention has a function to suppress the corona discharge when it is used for the impregnation of MF capacitors. However, when it is used singly, the suppressing effect can be continued only for a short period of time. Accordingly, a problem remains in the durability of obtained MF capacitors. Meanwhile, the natural fatty acid triglyceride containing a less amount of fatty acid ester having free hydroxyl radical has a buffer action to slow down the discharge when it is impregnated into MF capacitors.

BEST METHOD FOR CARRYING OUT THE INVENTION

In the following, the present invention will be described in more detail with reference to experiments. In the following description, "%" means % by weight.

Corona (Partial Discharge) Starting Voltage

A metal deposited film having a width of 75 mm with margins of 5 mm was prepared in an ordinary manner by vacuum-deposition of zinc on one side of a biaxially stretched film made of stretchable-type polypropylene.

Capacitor elements were made by rolling up the above film, and MF capacitors having a capacity of 3 $\mu$F was prepared by impregnating them at 40° C. in an ordinary manner with an aromatic hydrocarbon mixture, rapeseed oil and castor oil in the mixing ratios shown in Table 1.

The properties and compositions of above impregnating oils are as follows.

(1) Aromatic hydrocarbon mixture (MT):
Pour point −35° C., viscosity 12.2 cSt (40° C.); a mixture of benzylbenzene 14%, monomethyl derivative of benzylbenzene 25% and dimethyl derivative of benzylbenzene 61%.

(2) Rapeseed oil (NA):
Mainly consists of fatty acid triglyceride which scarcely contains fatty acid esters having free hydroxyl radical.

(3) Castor oil:
Mainly consists of fatty acid triglyceride which contains 88% of fatty acid ester having free hydroxyl radical.

The above capacitors were applied with gradually raising electric voltage at 25° C. to examine the corona starting voltage. The results are shown in Table 1.

From the results shown in Table 1, it is found out that the corona stating voltage is higher when an aromatic hydrocarbon mixture is used singly, but on the other hand, the corona starting voltages are lower when rapeseed oil or other oils are used.

In the impregnating oils shown in Table 1, NA (rapeseed oil 100%) and MT 60/castor oil 40, have almost the same values in viscosity. Although both of them have the same viscosities and MT 60/castor oil 40 has more amount of aromatic hydrocarbon having higher corona starting voltage than NA, the insulating oil of MT 60/castor oil 40 gives a lower corona starting voltage than that of NA. It is supposed that this fact occurs due to the free hydroxyl radical of castor oil rather than its higher viscosity.

Dielectric Breakdown Time under Constant Voltage Application

Capacitor elements were made by rolling up the metal deposited film obtained as above, and MF capacitors of 3 μF in capacity were prepared as above by impregnating an aromatic hydrocarbon mixture, rapeseed oil and castor oil in the mixing ratios shown in Table 1 at 40° C. in an ordinary manner.

Five capacitors in each sample, respectively, were applied with constant voltage (potential gradient 130 V/μm) at 60° C. and the average time periods until dielectric breakdown was caused to occur were measured. The average values were taken such that the maximum and minimum values were omitted and the average of remaining data were calculated. The results are shown in Table 1.

From the results shown in Table 1, it was found out that, although the values of dielectric breakdown time were short when the aromatic hydrocarbon mixture or rapeseed oil was used singly, the compositions containing both the components in specific mixing ratios had good electric characteristics due to the longer dielectric breakdown times.

As described above, the corona starting voltage is the highest when MT is used singly, while the durability under constant voltage application is markedly high when the composition containing both MT and NA in a specific mixing ratio is used. Incidentally, such an advantage cannot be found when castor oil is used in a mixture.

Resistance Change Rate of Metal Deposited Film

The state of changes of a metal deposition layer which is vacuum-deposited on a plastic film cannot be observed by a conventional method in which a film is soaked in an impregnating oil and changes in dimensions or weights are measured. Because the condition of a metal deposition layer is a matter of importance in MF capacitors, it is desirable that the condition of deposited metal layer can be determined directly.

In view of the above, a metallized plastic film having a thickness of 16 μm and a resistance of 4–6 Ω/□ was prepared by depositing zinc, in an ordinary manner, on one side of a biaxially stretched film made of stretchable-type polypropylene. The pieces of obtained film were soaked in the above-mentioned aromatic hydrocarbon mixture (MT), rapeseed oil (NA) and castor oil, phenylxylylethane (PXE) and alkylbenzene (LAB), respectively, and they were left in an atmosphere of nitrogen at 100° C. for 116 hours. After that, the resistance of them were measured. The rate of the change in resistance (resistance after soaking/resistance before soaking) was regarded as the degrees of swelling. The results are also shown in Table 1.

From the results in Table 1, it was found out that the resistances largely increase when the test film was impregnated with an aromatic hydrocarbon such as diarylethane or alkylnaphthalene as disclosed in the foregoing Japanese Laid-Open Patent Publication No. 60-35408. It is supposed that this is caused to occur by the cracks in the metal deposition layers caused by the swelling of the film. It will be understood, therefore, that the aromatic hydrocarbons disclosed in the above patent gazette are not suitable for MF capacitors.

According to Table, the change rate of resistance of castor oil is smaller than that of rapeseed oil, from which the castor oil is considered to be more suitable as an impregnating oil for MF capacitors. However, the castor oil mainly consists of the natural fatty acid triglyceride which contains much amount of fatty acid ester having free hydroxyl radical. Considering these facts together, the castor oil is not suitable as an impregnating oil for MF capacitors.

TABLE 1

| Impregnating Oil | Corona Starting Voltage (V/μm) | Dielectric Breakdown Time @ 60° C. (hrs) | Resistance Change Rate of Metallized Film Zn Dpst'd | Resistance Change Rate of Metallized Film Al Dpst'd |
|---|---|---|---|---|
| MT | 183 | 10 | 1.7 | 1.1 |
| MT 70/NA 30 | — | 350 | — | — |
| MT 65/NA 35 | 179 | — | — | — |
| MT 50/NA 50 | 176 | >1200 | — | — |
| MT 35/NA 65 | 166 | — | — | — |
| MT 30/NA 70 | — | 800 | — | — |
| NA | 145 | 300 | 2.0 | 1.3 |
| MT 60/CO 40 | 129 | — | — | — |
| MT 50/CO 50 | 125 | 5 | — | — |
| CO | — | — | 1.5 | 1.0 |
| PXE | — | — | 2.5 | 5.9 |
| LAB | — | — | 3.0 | 5.4 |

Remarks: Charged at Constant Voltage, Potential Gradient: 130 V/μm

Temperature of Soaking: 100° C.

Time Period of Soaking: 116 hrs

Notes:
Zn Dpst'd: Zinc deposited film

TABLE 1-continued

| | |
|---|---|
| Al Dpst'd: | Aluminum deposited film |
| MT: | Mixture of aromatic hydrocarbons |
| NA: | Rapeseed oil |
| CO: | Castor oil |
| PXE: | Phenylxylylethane |
| LAB: | Alkylbenzene |

The numerals by the symbols of oils indicate their contents in percents by weight.

INDUSTRIAL APPLICABILITY

The oil impregnated MF capacitor of the present invention excels in the durability under the charge of constant voltage. Moreover, the composition of the electrically insulating oil for impregnation can be adjusted as follows. When the thickness of a metal deposited film as an electrode is so small that the film suffers little damage in discharge, the content of aromatic hydrocarbon is increased such that the discharge is suppressed, and when the thickness of the film is so large that the film suffers much damage once discharge occurs, the content of natural fatty acid triglyceride, such as rape seed oil, is increased so as to discharge little by little.

We claim:

1. A capacitor comprising a metallized plastic film impregnated with an electrically insulating oil composition, said composition comprising 5% to 80% by weight, based on the total weight of the composition, of a natural fatty acid triglyceride containing less than 10% by weight of a fatty acid ester having three hydroxyl radicals and the remainder of the composition being an aromatic hydrocarbon, liquid at $-30°$ C., having the structural formula

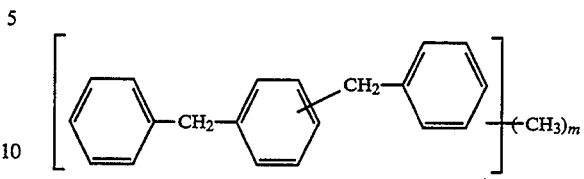

where m is an integer of 0 to 2.

2. A capacitor in accordance with claim 1 wherein said plastic film is polypropylene film.

3. A capacitor in accordance with claim 1 wherein said metallized plastic film is provided by a layer of a metal selected from the group consisting of zinc and aluminum.

4. A capacitor in accordance with claim 1 wherein said natural fatty acid triglyceride is provided by an ester selected from the group consisting of rape seed oil, soy bean oil and poppy oil.

5. A capacitor in accordance with claim 1 wherein said natural fatty acid triglyceride contains less than 5% by weight of said fatty acid ester having free hydroxyl radicals.

6. A capacitor in accordance with claim 1 wherein said insulating oil composition comprises 30% to 70% by weight of said natural fatty acid triglyceride.

* * * * *